United States Patent [19]

Kato et al.

[11] Patent Number: 5,303,793
[45] Date of Patent: Apr. 19, 1994

[54] STEERING APPARATUS

[75] Inventors: Kiyotaka Kato, Nishio; Shiro Takeuchi, Toyota; Masanori Natsume, Toyokawa; Seiji Kawakami, Susono; Ikuo Kushiro, Susono; Satoru Niwa, Susono, all of Japan

[73] Assignee: Toyoda Koki Kabushiki Kaisha, Kariya, Japan

[21] Appl. No.: 904,685

[22] Filed: Jun. 26, 1992

[30] Foreign Application Priority Data

Jun. 26, 1991 [JP] Japan .................. 3-183024
Aug. 26, 1991 [JP] Japan .................. 3-240398

[51] Int. Cl.$^5$ .................................. B62D 3/02
[52] U.S. Cl. .............................. 180/132; 180/149
[58] Field of Search ............ 180/132, 141, 142, 143, 180/148, 149; 91/375 A

[56] References Cited

U.S. PATENT DOCUMENTS 4,195,706 4/1980 Konishi .................. 180/132
5,156,228 10/1992 Kato et al. ............... 180/132

FOREIGN PATENT DOCUMENTS

2-14971 1/1990 Japan .

Primary Examiner—Mitchell J. Hill
Attorney, Agent, or Firm—Oblon, Spivak, McClelland, Maier & Neustadt

[57] ABSTRACT

A power steering apparatus of rack-and-pinion type comprising an input shaft steered by a driver, an output shaft operatively connected to a rack bar through a rack-and-pinion gear mechanism, a hydraulic cylinder operatively connected to the rack bar, and a rotary valve operatively connected to the input shaft. The steering apparatus further comprises an intermediate rotary member disposed between the input shaft and output shaft for rotation about an axis offset from the rotational axis of the output shaft, and a reduction gear mechanism arranged between the rotary valve and the intermediate rotary member. A cam mechanism is disposed between the intermediate rotary member and the output shaft for transmitting the rotation of the intermediate rotary member to the output shaft. The cam mechanism is composed of a cam groove formed on one of the intermediate rotary member and output shaft, and a follower roller provided on the other of the intermediate rotary member and output shaft to be engaged with the cam groove.

5 Claims, 9 Drawing Sheets

STEERING APPARATUS

BACKGROUND OF THE INVENTION

1. Field of the Invention

This invention relates to a steering apparatus for steering steerable wheels in a wheeled vehicle and, more particularly, to a steering apparatus capable of decreasing the steering gear ratio in accordance with increase of the rational angle of the steering wheel.

2. Prior Art of the Invention

In general, a conventional front wheel steering apparatus of this kind includes an input shaft arranged to be rotated by the driver's steering effort applied thereto, an output member operatively connected to a set of steerable front wheels by means of a steering linkage, and an interconnecting mechanism in the form of a rack and pinion mechanism, a ball screw mechanism or the like for operatively interconnecting the input shaft to the output member. In the interconnecting mechanism, however, a displacement ratio of the output member relative to a rotational amount of the steering wheel is constant. For this reason, the driver's feel in steering operation becomes insufficient, i.e., the driver feels that the steering operation is too light, when the steering wheel is steered at a large angle from a neutral position, and a maximum rotational angle of the steering wheel necessary for steering the front wheels at a desired maximum angle becomes large (for example, 540 degrees). In the case that the displacement ratio of the output member is increased to overcome the above problem, the driver's feel in steering operation becomes excessive, i.e., the driver feels that the steering operation is too heavy, at an initial stage of steering operation from the neutral position of the steering wheel.

A front steering apparatus disclosed in Japanese patent laid open No. 14971/1990 has been proposed to overcome the above-mentioned problem. In this steering apparatus, an intermediate shaft is arranged in parallel relationship with the coaxially arranged input and output shafts of the steering apparatus. A pair of oval gears are fixed to the input shaft and intermediate shaft, respectively, for coupling the input shaft and intermediate shaft through the oval gears while a pair of circular gears are fixed to the intermediate shaft and the output shaft, respectively, for coupling the intermediate shaft and the output shaft. With this construction, the displacement ratio of the output shaft to the input shaft increases in accordance with increase of rotational angle of the input shaft from the neutral position thereof. This steering apparatus is also provided with a hydraulic power cylinder for applying an assist force to the output operation member connected to steerable wheels, and a servo valve which responds to an input torque applied to the input shaft to supply a pressurized fluid to a pair of cylinder chambers of the power cylinder.

The steering apparatus, however, has a problem that the machining of the pair of the oval gears is difficult, and that a desired steering feel cannot be obtained, because the steering feel changes depend on the meshing condition of the gears. Further, since it is difficult to simultaneously reduce a backlash between the pair of the circular gears and a backlash between the pair of the oval gears, the assembly of the steering apparatus is troublesome.

SUMMARY OF THE INVENTION

Accordingly, it is an object of the present invention to provide an improved steering apparatus capable of providing an excellent steering feel to a driver.

It is another object of the present invention to provide an improved steering apparatus which can easily be manufactured and easily be assembled.

Briefly, a steering apparatus according to the present invention is provided with an input shaft arranged to be rotated by a steering effort and an output shaft operatively connected to steerable wheels by means of a steering linkage and an interconnecting mechanism, an intermediate rotary member disposed between the input shaft and the output member for rotation about an axis offset from the rotational axis of the output member, a rotation transmitting mechanism comprising an elastic member and disposed between the input shaft and intermediate rotary member for transmitting a rotational movement of the input shaft to the intermediate rotary member through the elastic member, detection means for detecting a steering effort applied to the input shaft, and assist force generating means operatively coupled to the output member for generating an assist force in accordance with the steering effort detected by the detection means. The steering apparatus further comprises a cam mechanism disposed between the intermediate rotary member and the output member for transmitting a rotational movement of the intermediate rotary member to the output member, and the cam mechanism is composed of a cam groove and a protrusion engaged with the cam groove. One of the intermediate rotary member and the output member is formed with the radial cam groove, the other of the intermediate rotary member and the output member is provided with the protrusion formed at a location radially offset from the respective rotary axes of the intermediate rotary member and output member. Further, in preferred embodiments, the rotation transmitting mechanism comprises a reduction mechanism, such as a reduction gear mechanism composed of an internal gear and a pinion gear.

In the steering apparatus, the steering gear ratio gradually decreases in accordance with increase of the rational angle of the steering wheel from its neutral position. Therefore, the steering effort required to steer the steering wheel is relatively small in an angular zone adjacent to the neutral position, while the required steering effort becomes gradually large when the steering wheel is rotated by a large amount. This characteristic provides an excellent steering feel to a driver.

Further, since the number of required parts is smaller as compared with the conventional steering apparatus, the steering apparatus according to the present invention can easily be manufactured and easily be assembled.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENTS

Preferred embodiments of the present invention will now be described with reference to figures.

First Embodiment

Figure 1:
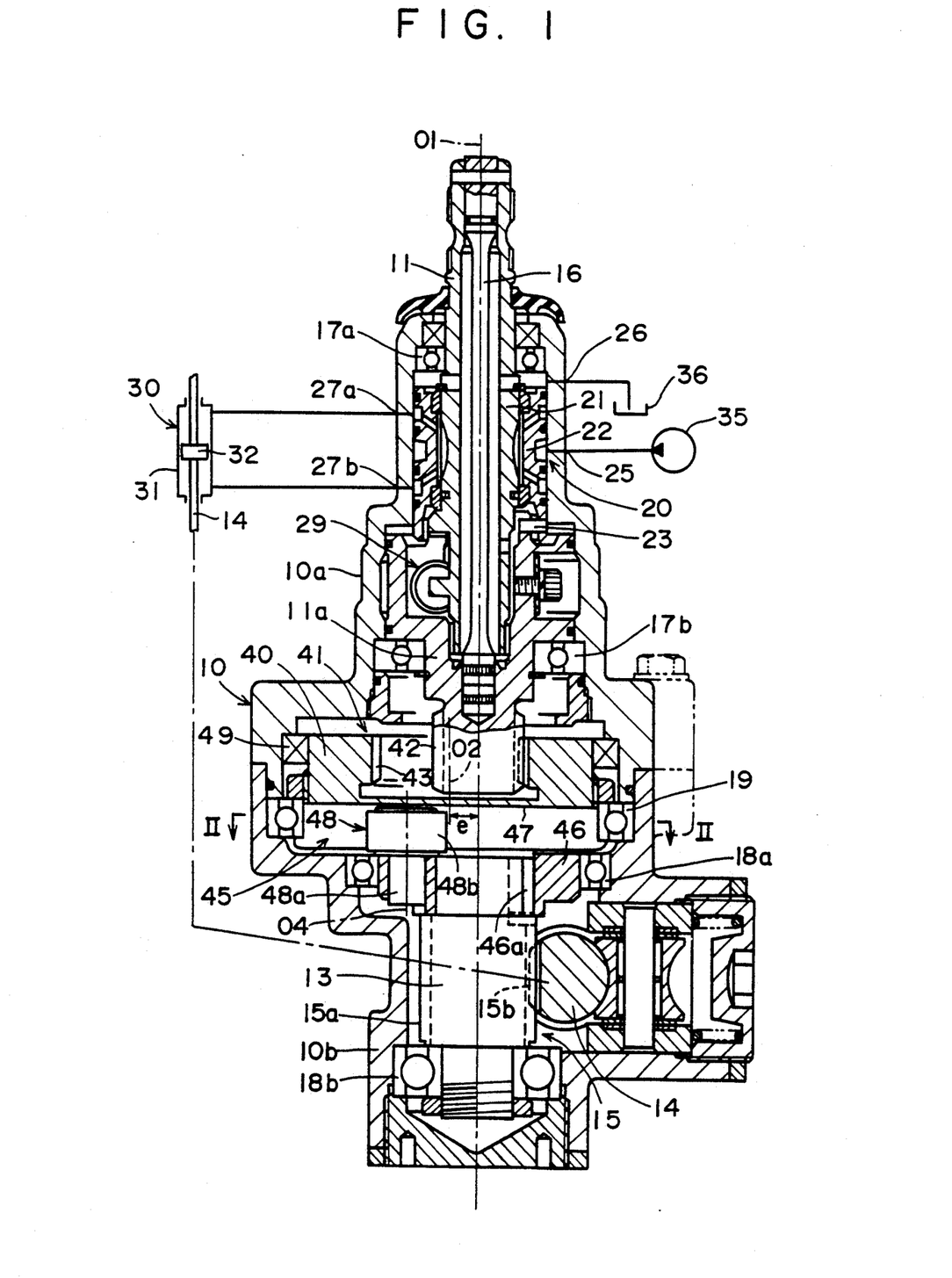
FIG. 1 is a longitudinal sectional view of a steering apparatus according to a first embodiment of the present invention.

In FIG. 1, there is illustrated a front wheel steering apparatus, and the housing assembly 10 thereof includes a valve housing 10a and a rack housing 10b fastened to one another by means of bolts. Input shaft 11, intermediate shaft 11a and output shaft 13 are arranged within the valve housing 10a and rack housing 10b for respective rotational movements about a common axis O1. The input shaft 11 and intermediate shaft 11a are interconnected by means of a torsion bar 16 for relative rotation therebetween. A lateral rack bar 14 is arranged orthogonally to the output shaft 13 and supported axially movably on the rack housing 10b. The output shaft 13 is operatively connected to the rack bar 14 by means of an interconnecting mechanism 15 which includes a pinion 15a integrally provided on the lower end portion of the output shaft 13 and being in meshing engagement with the toothed portion 15b of the rack bar 13. The rack bar 14 has opposite ends operatively connected to a set of steerable front wheels (not shown) by means of a steering linkage (not shown).

The front wheel steering apparatus is provided therein with a rotary valve assembly 20 constituting a control mechanism for control of a hydraulic power cylinder 30. The rotary valve assembly 20 includes a valve rotor 21 integrally formed on the input shaft 11 and a valve sleeve 22 rotatably received within an internal bore of valve housing 10a in surrounding relationship with the valve rotor 21 and connected to the intermediate shaft 11a by means of a radial pin 23. The valve housing 10a has inlet and exhaust ports 25, 26 and a pair of distribution ports 27a, 27b.

In the housing 10, a reduction mechanism 41 and a steering characteristic generating mechanism 45 are arranged between the intermediate shaft 11a and the output shaft 13.

Namely, a intermediate rotary member 40 is supported within the rack housing 10b through a bearing 19 for rotational movement about an eccentric axis O2 which is parallel to the axis O1. The eccentric distance of the axis O2 with respect to the axis O1 is e. An internal gear 43 is coaxially formed in the first half portion (upper portion in FIG. 1) of the intermediate rotary member 40, and the internal gear 43 is meshed with an input pinion 42 integrally formed on the lower end portion of the intermediate shaft 11a. The internal gear 43 and input pinion 42 constitute the reduction mechanism 41.

Figure 2:
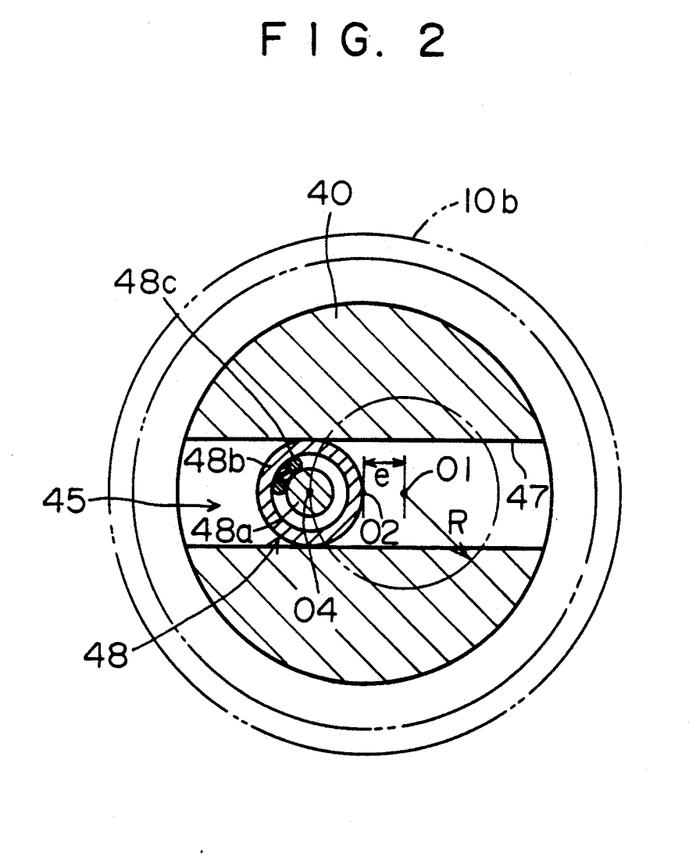
FIG. 2 is a sectional view taken along line II—II in FIG. 1.

The steering characteristic generating mechanism 45 is provided with a output rotary member 46 fixed to the output shaft 13, which is supported by the rack housing 10b through a pair of bearings 18a and 18b. The output rotary member 46 and output shaft 13 constitute an output member. Although the output shaft 13 and the input shaft 11 share the common rotational axis O1 in this embodiment, the output shaft 13 may be arranged so that the axis of thereof is offset from the axis O1. The second half portion (lower half portion) of the intermediate rotary member 40 has an end surface opposing to the output rotary member 46, and a cam groove 47 extending in a radial direction is formed on the end surface, as shown in FIG. 2. Also, the output rotary member 46 has an end surface opposing to the intermediate rotary member 40, and a protrusion 48 is provided on the end surface at a radial location offset from the axis O1 by a predetermined distance R. This distance R is larger than the eccentric distance e of the axis O2 with respect to the axis O1. The protrusion 48 is composed of a pin 48a fixed to the output rotary member 46 in parallel relationship with the axis O1, and roller 48b carried on the pin 48a through needle rollers 48c, and the peripheral surface of the roller 48b is engaged with the cam groove 47 with no clearance.

The hydraulic power cylinder 30 includes a cylinder housing 31, in which a rack bar 14 is axially movably received in liquid-tight manner. A piston 32 is fixed to the rack bar 13, and subdivides the interior of the cylinder housing 31 into a pair of opposite fluid chambers. The rotary valve assembly 20 is connected at its distribution ports 27a, 27b to the fluid chambers of cylinder housing 31 and connected at its inlet and exhaust ports 25 and 26, respectively to a hydraulic pump 35 and a fluid reservoir 36. The rotary valve 20 is operated in response to relative rotation between the input 11 and intermediate shaft 11a to control the supply of pressurized hydraulic fluid from the hydraulic pump 35 into one of the fluid chambers of the cylinder housing 31 and discharge of the hydraulic fluid from the other fluid chamber of cylinder housing 31 into the fluid reservoir 36. Under control of the rotary valve 20, the power cylinder 30 is activated to apply a hydraulic assist force to the front road wheels through the rack bar 14 in accordance with the steering effort applied to the input shaft 11.

A reaction mechanism 29 is arranged between the input shaft 11 and intermediate shaft 11a to change the characteristic of the torsion movement between the input shaft 11 and the intermediate shaft 11a. The detailed structure of the reaction mechanism 29 will not be described herein. An oil seal 49 is arranged between the outer periphery of the intermediate rotary member 40 and the valve housing 10a for fluidly separating the reaction mechanism 29 and the steering characteristic generating mechanism 45.

The operation of the above-mentioned front steering apparatus will now be described.

When the input shaft 11 is rotated by a driver's steering effort through a steering wheel and a handle shaft 10 (both are not shown), the intermediate shaft 11a is rotated through the torsion bar 16, whereby the intermediate rotary member 40 is rotated at a reduced speed through the reduction mechanism 41 composed of the input pinion 42 and internal gear 43. When the steering wheel is located at the neutral position, the axis O2 of the intermediate rotary member 40, the axis O1 of the input and output shafts 11 and 13, and the axis O4 of the roller 48b are aligned in a common plane, as shown in FIG. 2. When the intermediate rotary member 40 is rotated in clockwise or counter clockwise direction, the roller 48b of the protrusion 48 is moved outwardly in a radial direction along the cam groove 47 in accordance with the rotation of the intermediate rotary member 40. With this operation, the distance between the axis O4 of the protrusion 48 and the axis O2 gradually increases and becomes maximum when the intermediate rotary member 40 is rotated by 180 degrees.

The detailed operation of the steering characteristic generating mechanism 45 will now be described with reference to FIGS. 4 and 5.

Figure 4:
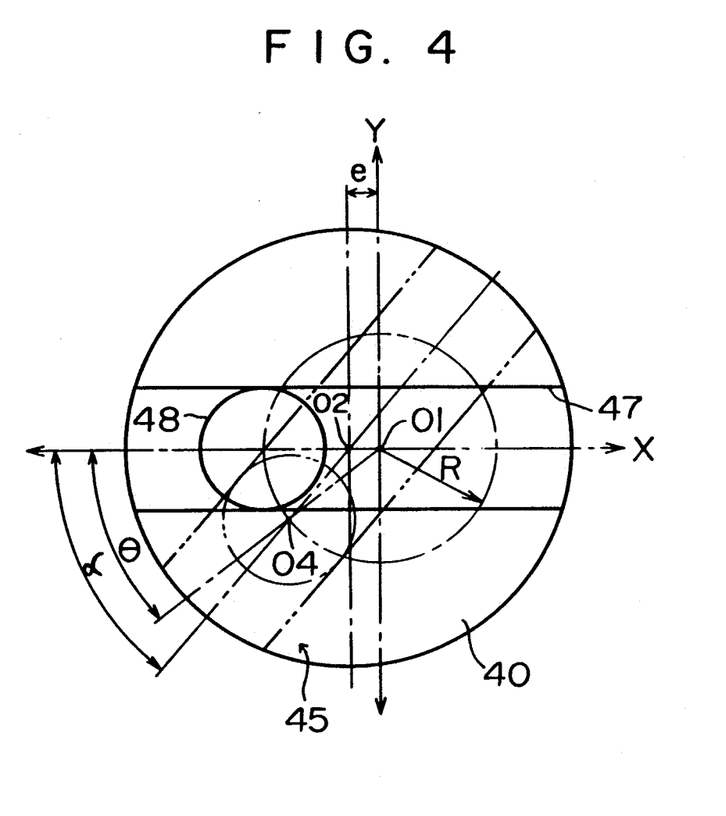
FIG. 4 is an explanatory chart illustrating the operation of the steering characteristic generating mechanism in the first embodiment.

In the FIG. 4, a first line connecting the axis O2 of the intermediate rotary member 40 and the axis O1 of the input and output shaft 11 and 13, and a second line perpendicular to the first line and passing through the axis O1 correspond to X-axis and Y-axis of an X-Y coordinate system.

The coordinate (X, Y) of the axis O4 of the protrusion 48 is expressed as follows:

$$X = -R \cdot \cos \theta$$

$$Y = -R \cdot \sin \theta$$

where $\theta$ is a rotational angle of the output shaft 13 form its neutral position.

The relationship between the rotational angle $\alpha$ of the intermediate rotary member 40 and the rotational angle $\theta$ of the output shaft 13 is expressed as follows:

$$\tan \alpha = R \sin\theta / (R \cdot \cos\theta - e)$$
$$= \sin\theta / (\cos\theta - r)$$

where $r = e/R$.

Accordingly, the following equation is obtained:

$$\alpha = \tan^{-1}(\sin \theta / (\cos \theta - r))$$

Figure 5:
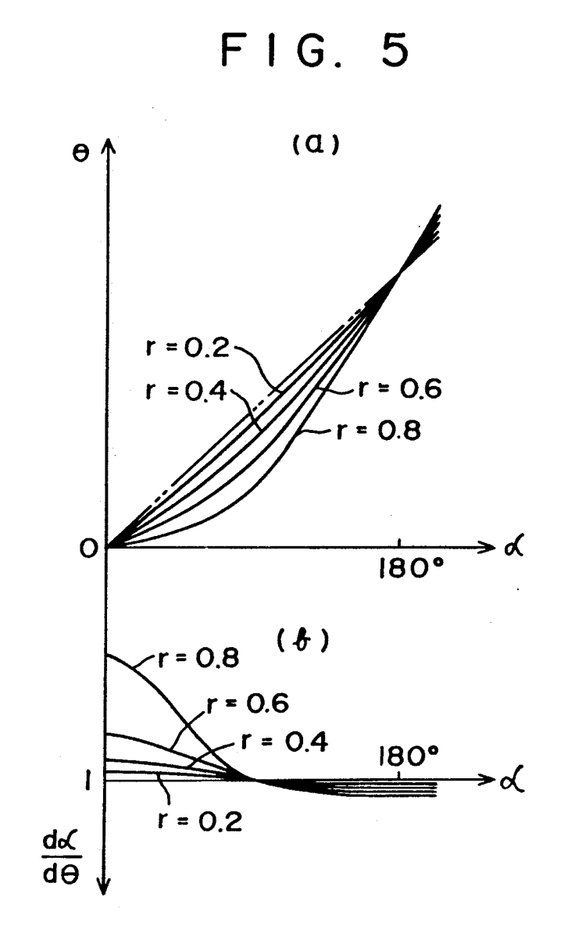
FIG. 5 is a graph showing the characteristic of the steering characteristic generating mechanism in the first embodiment.

The relationship between the rotational angles $\alpha$ and $\theta$ expressed by the above-mentioned equation is shown in FIG. 5 (a). As is clearly understood from the graph in FIG. 5 (a), inclinations of the characteristic curves increase as the rotational angle $\alpha$ approaches to 180 degrees. Accordingly, the reduction ratio between the rotational angle $\alpha$ and rotational angle $\theta$ decreases as the rotational angle $\alpha$ approaches to 180 degrees, as shown in FIG. 5 (b). The amount of deceases of the reduction ratio becomes large in accordance with increase of the ratio r obtained by dividing the eccentric distance e by the distance R.

The reduction ratio can be changed by changing the eccentric distance e and distance R. Since the intermediate rotary member 40 is rotated at a reduced speed as compared with the input shaft 11 rotating together with the steering wheel, the reduction ratio between the intermediate rotary member 40 and output shaft 13 becomes minimum when the steering wheel is steered by a predeterminable angle which is larger than 180 degrees and corresponds to the reduction ratio of the reduction mechanism 41.

Figure 3:
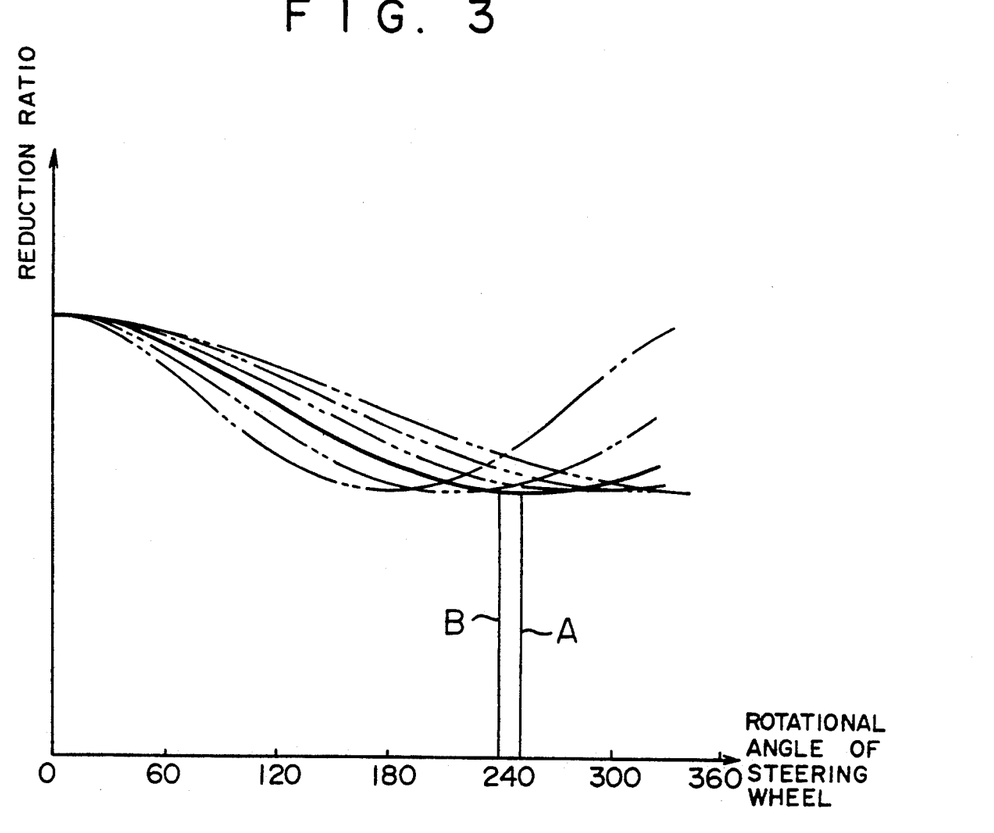
FIG. 3 is a graph showing changes in the steering gear ratio of the steering apparatus according to the first embodiment when the rotational angle of the steering wheel increases.

The rotation of the output shaft 13 is converted to an axial movement of the rack bar 14 by the interconnecting mechanism 15, and the axial movement of the rack bar 14 is transmitted to the front steerable wheels through the steering linkage. Since the ratio of swing amount of the front wheels to rotational amount of the output shaft 13 is substantially constant irrespective of the rotational angle of the output shaft 13, when the steering angle is large. Accordingly, the steering gear ratio, i.e., the reduction ratio between the rotational amount of the steering wheel and the swing amount of the front wheels changes, for example, as illustrated by a solid line in FIG. 3. Namely, the steering gear ratio is large when the steering wheel is at its neutral position, and gradually decreases in accordance with increase of the rotational angle of the steering wheel and becomes minimum when the rotational angle of the steering wheel reaches an angle A. The steering gear ratio increases when the steering wheel is rotated more, and presents an inverse characteristic. The angle A at which the steering gear ratio becomes minimum can be changed, as illustrated by broken lines in FIG. 3, by changing the reduction ratio of the reduction mechanism 41. Further, a stopper mechanism (not shown) for preventing the steering wheel from being rotated more than a predetermined angle B, for example 240 degrees, which is smaller than the angle A. Although the characteristic curves illustrated by the broken lines in FIG. 3, which indicate changes in the steering gear ratio, have the same maximum value and the same minimum value, the maximum value and minimum value can be changed by changing the eccentric distance e and distance R.

As described above, in the steering apparatus according to the first embodiment, the steering gear ratio gradually decreases in accordance with increase of the rational angle of the steering wheel from its neutral position. Therefore, the steering effort required to steer the steering wheel is relatively small in an angular zone adjacent to the neutral position, while the required steering effort becomes gradually large when the steering wheel is rotated by a large amount. This characteristic provides an excellent steering feel to a driver.

Further, the reduction ratio of the reduction mechanism and the steerable angular range of the steering wheel can be adjusted so that the steerable angle is larger than 180 degrees, and the steering gear ratio continuously decreases within the steerable range. It is therefore possible to solve a problem that the steering gear ratio increases after decrease at a particular steering angle, which characteristic would give a clumsy feeling to the driver. Similarly, the changing rate of the steering gear ratio can be adjusted, by changing the reduction ratio of the reduction mechanism, without affecting the maximum and minimum values of the steering gear ratio.

Since the input pinion 42 and internal gear 43 are integrally formed on the intermediate shaft 11a and intermediate rotary member 40, respectively, the number of the components of the steering apparatus does not increase in spite of the addition of the reduction mechanism 41. Further, the size of the steering apparatus does not become large, because the reduction mechanism 41 is arranged within the inside space of the intermediate rotary member 40.

Further, the rotary valve 20 is operable in response to the input shaft 11, which is directly coupled to the steering shaft, the rotary valve 20 operates in proportion to a steering effort applied to the steering wheel by a driver, without being affected by the change in the steering gear ratio and the tooth bearing of the reduction mechanism, so that the power cylinder 30 applies to the rack shaft 14 (output operation member) an assist force substantially proportional to the steering effort applied to the steering wheel. Therefore, it is possible to prevent the fluctuation of the assist force, which is produced due to instability of the reduction mechanism and the steering characteristic generating mechanism, from being transmitted inversely to the input shaft, steering shaft and steering wheel. The required steering effort therefore smoothly increases in proportion to increase of the rotational angle of the steering wheel from the neutral position.

Second Embodiment

Figure 6:
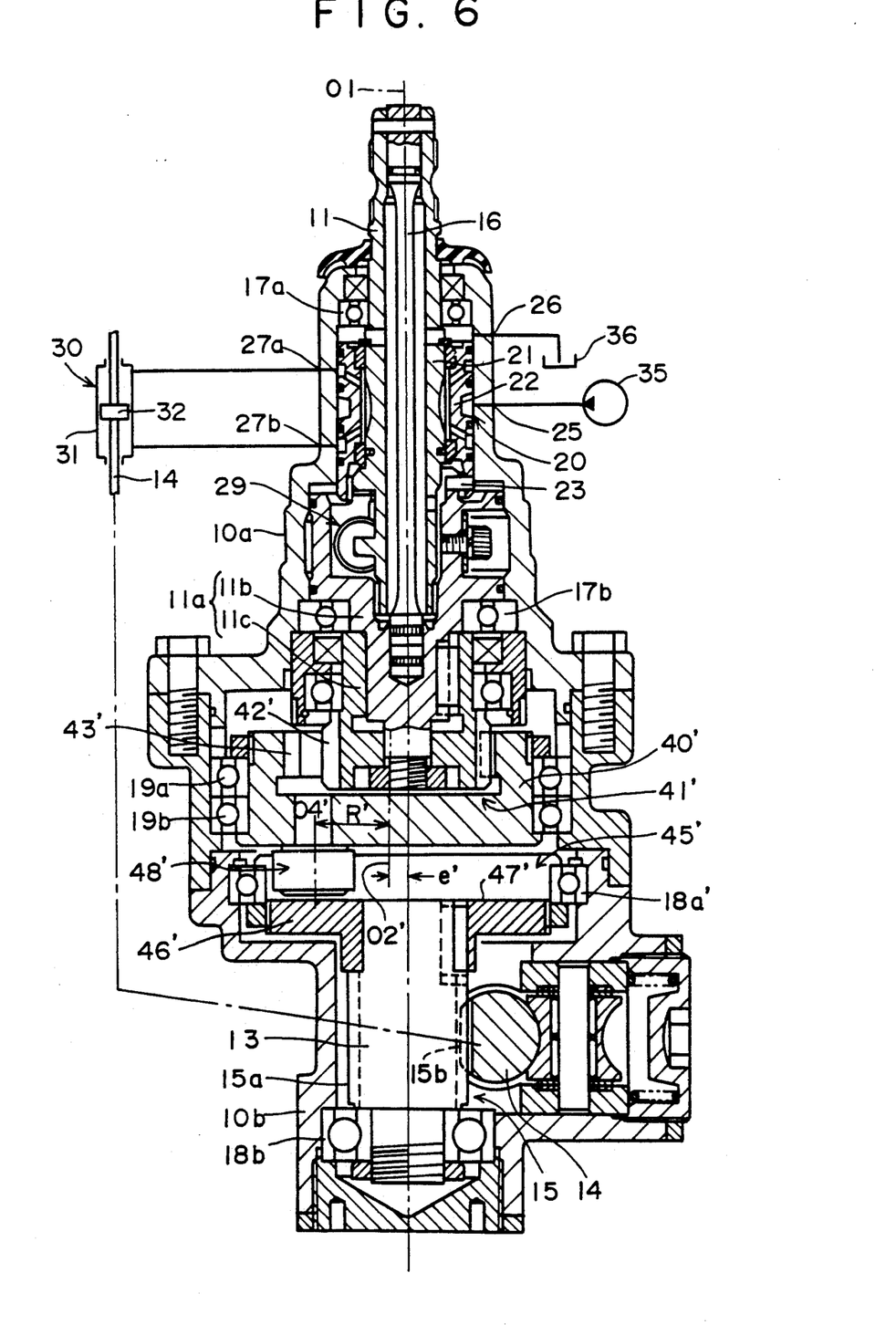
FIG. 6 is a longitudinal sectional view of a steering apparatus according to a second embodiment of the present invention.

The second embedment of the present invention will now be described with reference to FIGS. 6, 7 and 8.

Since the most part of the steering apparatus according to this embodiment is the same as that of the first embodiment, only part different from the first embodiment will be described. In this embodiment, the intermediate shaft 11a is composed of a first intermediate shaft 11b and a second intermediate shaft 11c, and the protrusion 48' is provided on the end surface of the intermediate rotary member 40' while the cam groove 47' is formed on the end surface of the output rotary member 46' to be engaged with the protrusion 48', as shown in FIG. 6. The intermediate rotary member 40' is supported by a pair of bearings 19a and 19b for rotation about an axis O2' offset form the axis O1 of the input shaft 11 by an eccentric distance e', while the rotational axis O4' of the protrusion 48' is offset from the axis O1 by an distance R'.

The operation of the steering characteristic generating mechanism 45 will now be described with reference to FIGS. 7 and 8.

Figure 7:
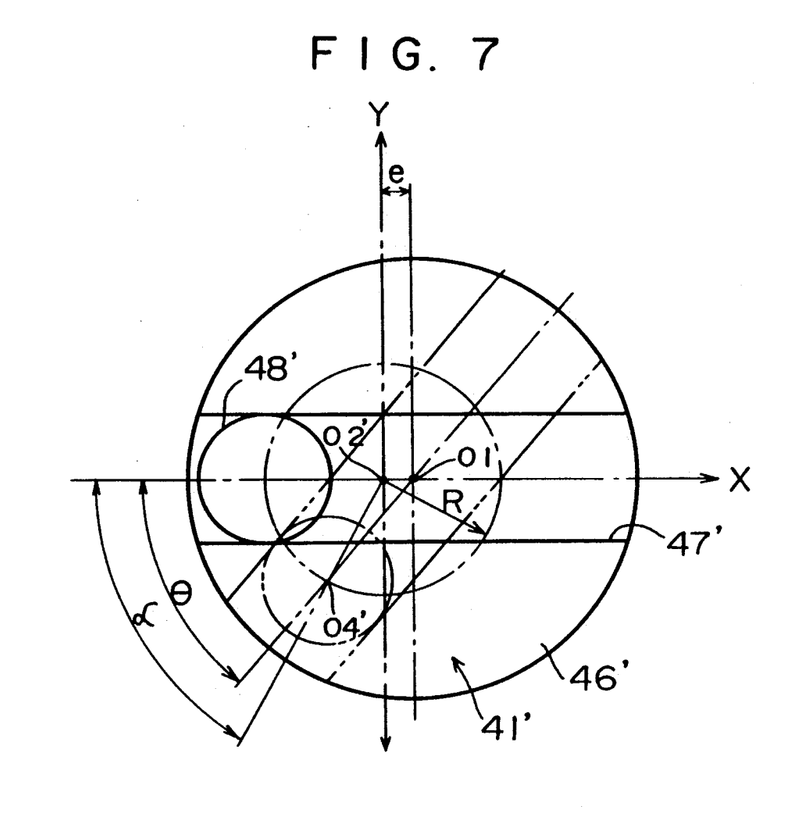
FIG. 7 is an explanatory chart illustrating the operation of the steering characteristic generating mechanism in the second embodiment.

In the FIG. 7, a first line connecting the axis O2' the axis O1, and a second line perpendicular to the first and Y-axis of an X-Y coordinate system.

The coordinate (X, Y) of the axis O4' of the protrusion 48' is expressed as follows:

$$X = -R \cdot \cos \alpha$$

$$Y = -R \cdot \sin \alpha$$

where $\alpha$ is a rotational angle of the intermediate rotary member 40'.

The relationship between the rotational angle $\alpha$ of the intermediate rotary member 40' and the rotational angle $\theta$ of the output shaft 13 is expressed as follows:

$$\tan \theta = R \sin\alpha / (R \cdot \cos\alpha + e)$$
$$= \sin\alpha / (\cos\alpha + r)$$

where $r = e/R$.

Accordingly, the following equation is obtained:

$$\theta = \tan^{-1}(\sin \alpha / (\cos \alpha + r))$$

Figure 8:
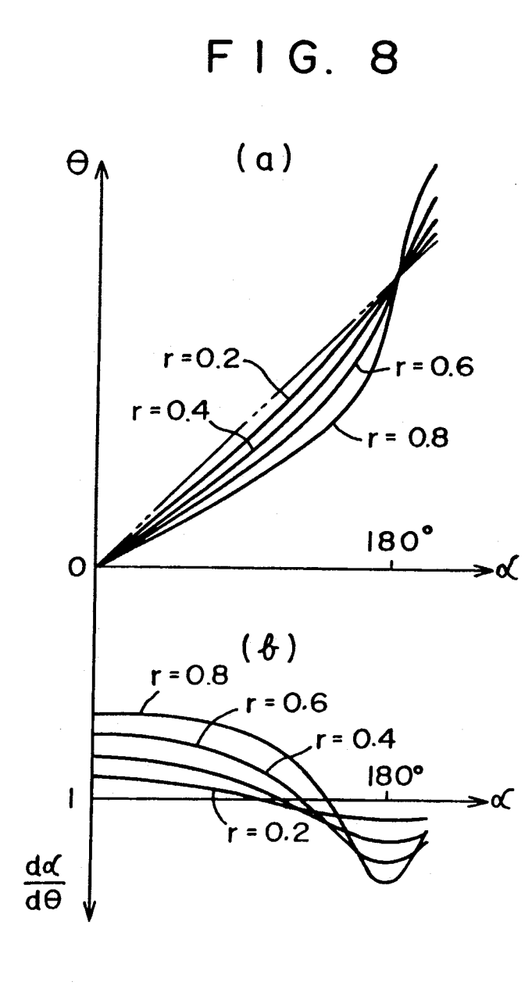
FIG. 8 is a graph showing the characteristic of the steering characteristic generating mechanism in the second embodiment.

The relationship between the rotational angles $\alpha$ and $\theta$ expressed by the above-mentioned equation is similar to that in the first embodiment, and is shown in FIG. 8 (a). As is clearly understood from the above graph in FIG. 8 (a), inclinations of the characteristic curves increase as the rotational angle $\alpha$ approaches to 180 degrees. Accordingly, the reduction ratio between the rotational angle $\alpha$ and rotational angle $\theta$ decreases as the rotational angle $\alpha$ approaches to 180 degrees, as shown in FIG. 8 (b). The amount of deceases of the reduction ratio becomes large in accordance with increase of the ratio r obtained by dividing the distance e by the distance R.

Since the operation of the steering apparatus according to this invention is almost same as that of the first embodiment, the explanation of the operation will be omitted.

The steering apparatus according to this embodiment has the same advantages as those of the first embodiments.

Third Embodiment

Figure 9:
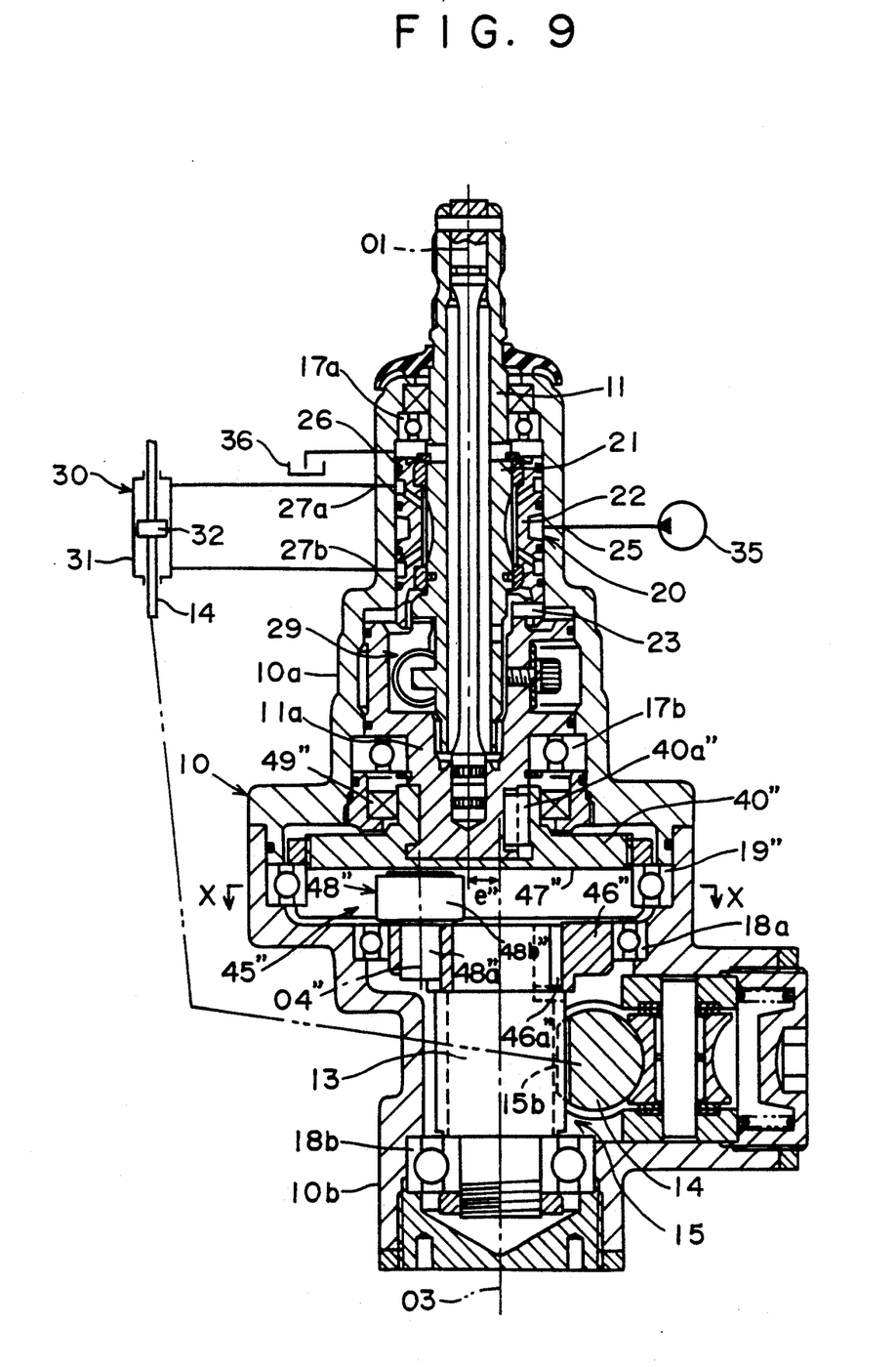
FIG. 9 is a longitudinal sectional view of a steering apparatus according to a third embodiment of the present invention.
Figure 10:
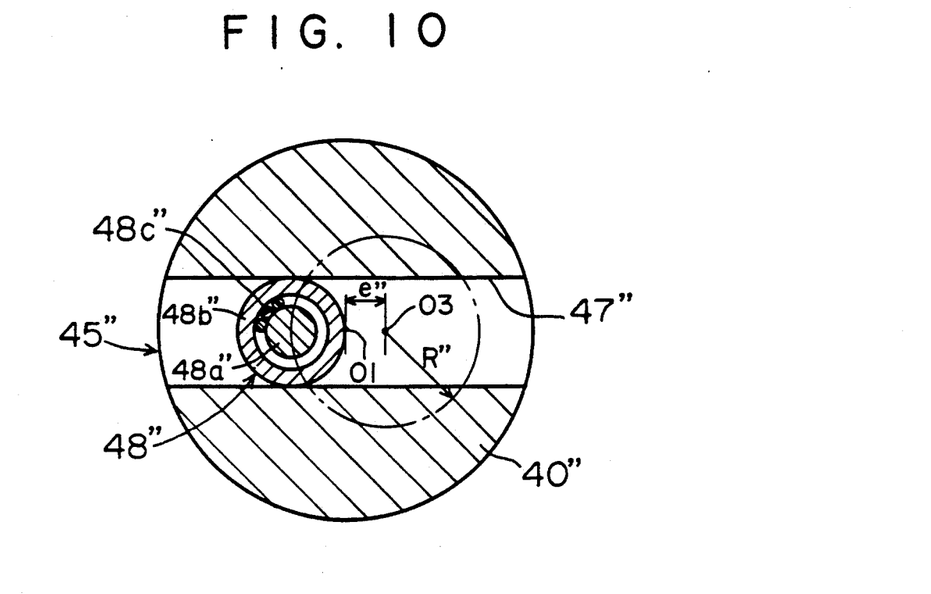
FIG. 10 is a sectional view taken along line X—X in FIG. 9.

The third embodiment of the present invention will now be described with reference to FIGS. 9, 10 and 11.

Since the most part of the steering apparatus according to this embodiment is the same as that of the first embodiment, only part different from the first embodiment will be described.

In this embodiment, the reduction mechanism is omitted as compared with the first embodiment. Namely, the intermediate rotary member 40" is directly connected to the intermediate shaft 11a" through a key 40a".

Figure 11:
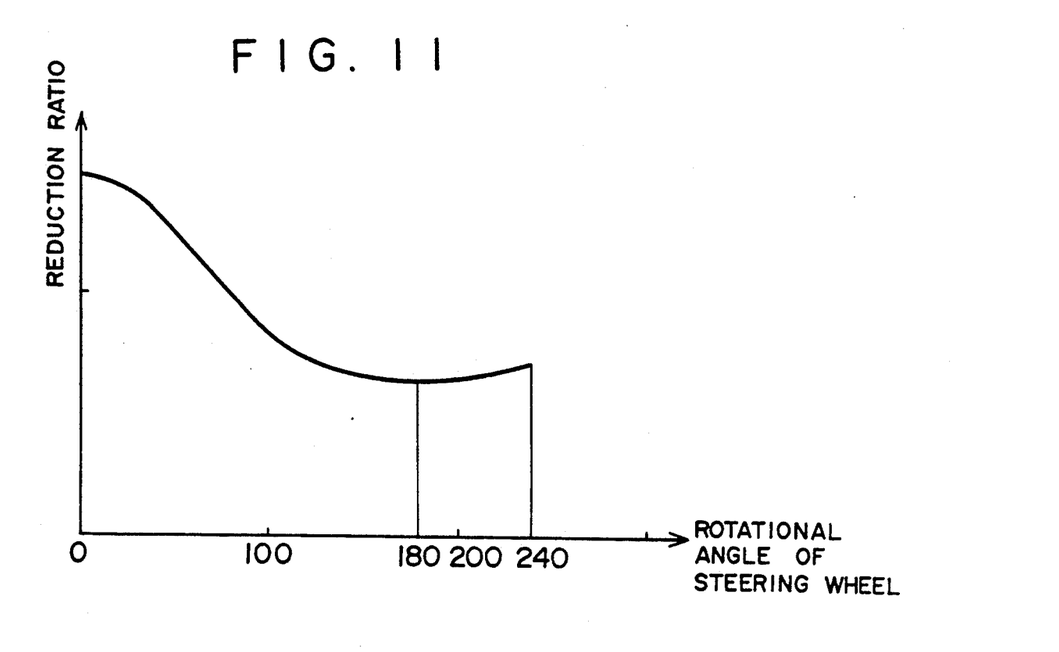
FIG. 11 is a graph showing a change in the steering gear ratio of the steering apparatus according to the third embodiment when the rotational angle of the steering wheel increases.

The change in the steering gear ratio of the steering apparatus according to this embodiment is shown in FIG. 11.

The steering gear ratio is large when the steering wheel is located at its neutral position, and gradually decreases in accordance with increase of the rotational angle of the steering wheel and becomes minimum when the rotational angle of the steering wheel reaches 180 degrees. The steering gear ratio increases when the steering wheel is further rotated. Further, a stopper mechanism (not shown) is provided for preventing the steering wheel from being rotated more than a predetermined angle, for example 240 degrees.

The steering apparatus according to this embodiment also has the similar advantages to those of the first embodiment.

Forth Embodiment

Figure 12:
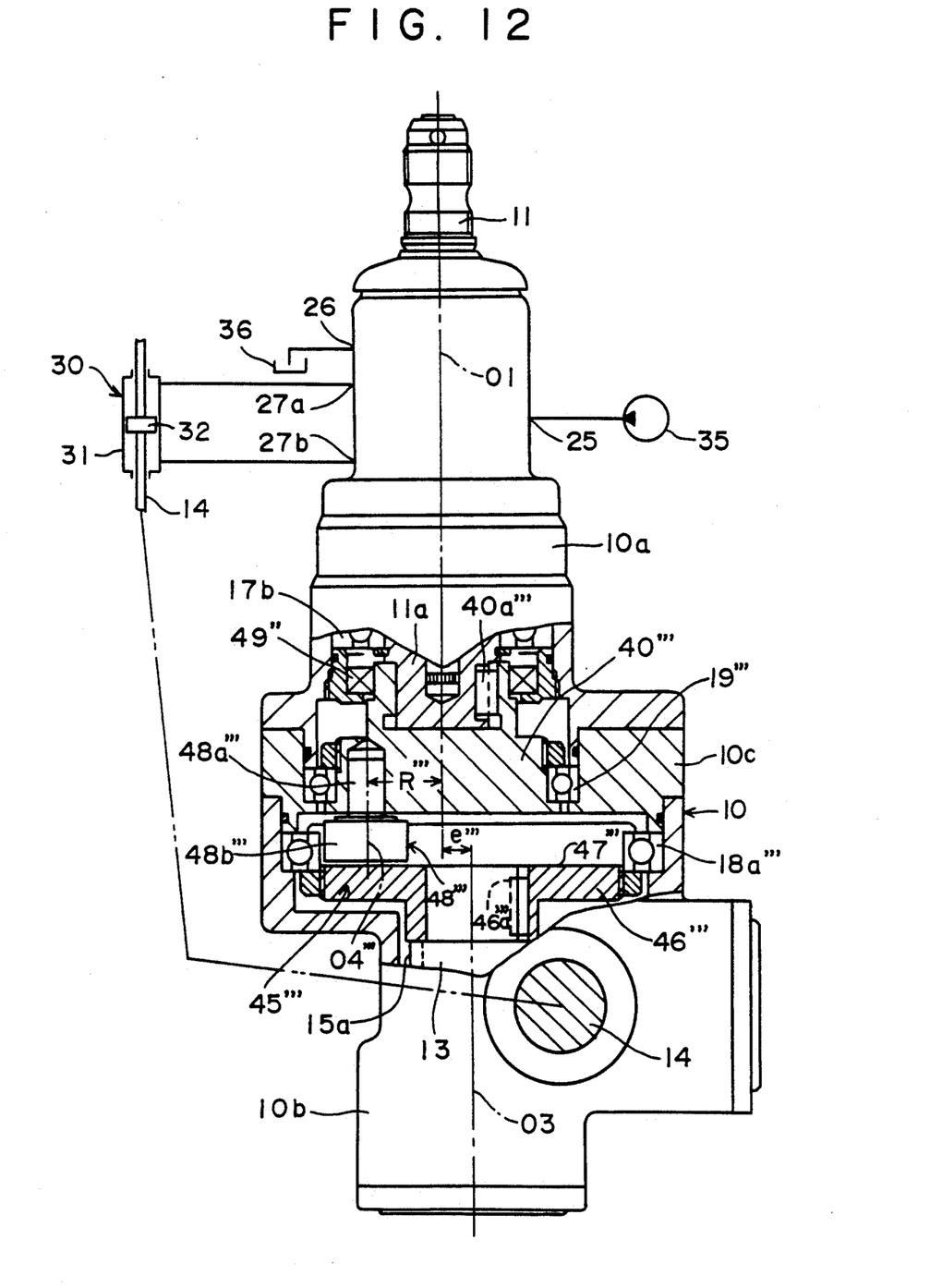
FIG. 12 is a longitudinal sectional view of a steering apparatus according to a forth embodiment of the present invention.

The forth embodiment of the present invention will now be described with reference to FIG. 12.

Since the most part of the steering apparatus according to this embodiment is the same as that of the third embodiment, only part different from the first embodiment will be described. In this embodiment, the protrusion 48''' is provided on the end surface of the intermediate rotary member 40''' while the cam groove 45''' is formed on the end surface of the output rotary member 46''' to be engaged with the protrusion 48'''.

The steering apparatus according to this embodiment has the same advantages as those of the third embodiments.

Although power steering apparatus of hydraulic type are explained in the above-mentioned embodiments, this invention may be applied to other types of power steering apparatus such as of electric type. This invention may also be applied to steering apparatus using other types of interconnection mechanism, such as ball-screw type and worm-pin type for connecting the output shaft and the output operation member. Further, this invention may be applied to a steering apparatus for rear steerable wheels of a vehicle.

Obviously, numerous modifications and variations of the present invention are possible in light of the above teachings. It is therefore to be understood that within the scope of the appended claims, the present invention may be practiced otherwise than as specifically described herein.

What is claimed is:

1. A steering apparatus operable in response to the driver's steering effort applied thereto to steer steerable wheels, comprising:
   an input shaft arranged to be rotated by the steering effort;
   an output member operatively connected to the steerable wheels by means of steering linkage and an interconnecting mechanism;
   an intermediate rotary member disposed between said input shaft and said output member for rotation about an axis offset from the rotational axis of said output member;
   a rotation transmitting mechanism comprising an elastic member and disposed between said input shaft and said intermediate rotary member for transmitting a rotational movement of said input shaft to said intermediate rotary member through said elastic member;
   a cam groove formed on an end surface of one of said intermediate rotary member and said output member, said cam groove being extended in a radial direction;
   a protrusion provided on an end surface of the other of said intermediate rotary member and said output member at a location radially offset from the respective rotary axes of said intermediate rotary member and said output member to be engaged with said cam groove;
   assist force generating means operatively coupled to said output member for applying an assist force to said output member; and
   a control mechanism for controlling the assist force generating means so as to control the assist force in accordance with the steering effort.

2. A steering apparatus according to claim 1, wherein said interconnecting mechanism is composed of a rack bar connected to said steerable wheels through said steering linkage, a rack gear formed on said rack bar, and a pinion gear formed on said output member.

3. A steering apparatus according to claim 2, wherein said rotation transmitting mechanism comprises a intermediate shaft coupled to said input shaft through said elastic member, a reduction mechanism for reducing the rotational movement of said intermediate shaft to transmit the reduced rotational movement to said intermediate rotary member.

4. A steering apparatus according to claim 3, wherein said reduction mechanism is composed of an input pinion formed on said intermediate shaft and an internal gear integrally formed on said intermediate rotary member to be meshed with said input pinion.

5. A steering apparatus according to claim 3, wherein said assist force generating means is composed of a hydraulic pump for supplying a pressurized fluid and a hydraulic cylinder operatively connected to said rack bar, and said control mechanism comprises a rotary valve disposed between said input shaft and said intermediate shaft to be operable in response to the steering effort so as to control a fluid flow between said pump and said cylinder.

* * * * *